United States Patent
Yonezawa

[11] Patent Number: 5,887,862
[45] Date of Patent: Mar. 30, 1999

[54] WORK SUPPORT

[75] Inventor: Keitaro Yonezawa, Kobe, Japan

[73] Assignee: Kabushiki Kaisha Kosmek, Hyogo, Japan

[21] Appl. No.: 852,498

[22] Filed: May 7, 1997

[30] Foreign Application Priority Data

May 17, 1996 [JP] Japan .................................. 8-122881

[51] Int. Cl.⁶ .................................................. B23B 31/30
[52] U.S. Cl. ............................ 269/310; 279/4.09; 279/50
[58] Field of Search ................................ 279/50, 54, 57, 279/4.09; 269/309, 310, 20, 315, 316, 317

[56] References Cited

U.S. PATENT DOCUMENTS

| 3,168,322 | 2/1965 | Dziedzic | 279/4.09 |
| 3,643,765 | 2/1972 | Hanchen . | |
| 3,791,661 | 2/1974 | Giles | 279/50 |
| 3,880,046 | 4/1975 | Sessody | 279/50 |
| 4,791,841 | 12/1988 | Pruvot et al. | 279/4.09 |
| 4,836,091 | 6/1989 | Taylor . | |
| 4,948,105 | 8/1990 | Yonezawa . | |

FOREIGN PATENT DOCUMENTS 6-7868  3/1994  Japan .

*Primary Examiner*—Robert C. Watson
*Attorney, Agent, or Firm*—Bacon & Thomas, PLLC

[57] ABSTRACT

A support rod (3) vertically movably inserted into a housing (2) is urged upward by an advancing spring (4). An annular piston (6) is inserted between a barrel portion (2c) of the housing (2) and an outer peripheral surface of the support rod (3). A collet (10) externally fitted onto a holding and fixing portion (C) of the support rod (3) is received by a lower end wall (2b) of the housing (2). A tapered transmission member (17) externally fitted onto the collet (10) is urged downward by a holding spring (22). The urging force clamps the support rod (3) at a predetermined height through the collet (10).

9 Claims, 2 Drawing Sheets

WORK SUPPORT

BACKGROUND OF THE INVENTION

1. Technical Field

The present invention relates to an apparatus for supporting a work when machining the work by a milling machine, a grinder or the like machine tools.

2. Explanation of Prior Art

Generally, a work support of this type is adapted to hold a support rod at a predetermined height through a collet with a pressurized fluid supplied to a clamping actuation chamber (for example, see Japanese Utility Model Publication No. 6-7868 proposed previously by an Assignee of the present Applicant).

Though the above-mentioned conventional technique is excellent in that it can strongly hold the support rod with fluid pressure, it has a problem that the foregoing holding force disappears when the actuation chamber loses its pressure due to the leakage of the pressurized fluid or the like.

SUMMARY OF THE INVENTION

The present invention has an object to solve the aforesaid problem of the conventional technique.

In order to accomplish the object, the invention of claim 1 has constructed a work support as follows.

A support rod is inserted into a housing movably in an axial direction, and an advancing means advances the support rod outwardly of the housing. A collet is externally fitted onto a holding and fixing portion of the support rod and received by the housing in the axial direction. A tapered transmission member externally fitted onto the collet is moved in the axial direction by a holding spring to diametrically contract the collet. And the diametrical contraction of the collet is released by moving the transmission member against the spring by a fluid-pressure piston in a direction reverse to the axial direction.

The invention of claim 1 can clamp the support rod at a predetermined height by diametrically contracting the collet through the urging force of the holding spring. Therefore, even if an actuation chamber loses its fluid pressure for some reason, the clamping force of the support rod does not disappear.

DESCRIPTION OF THE PREFERRED EMBODIMENTS

Figure 1:
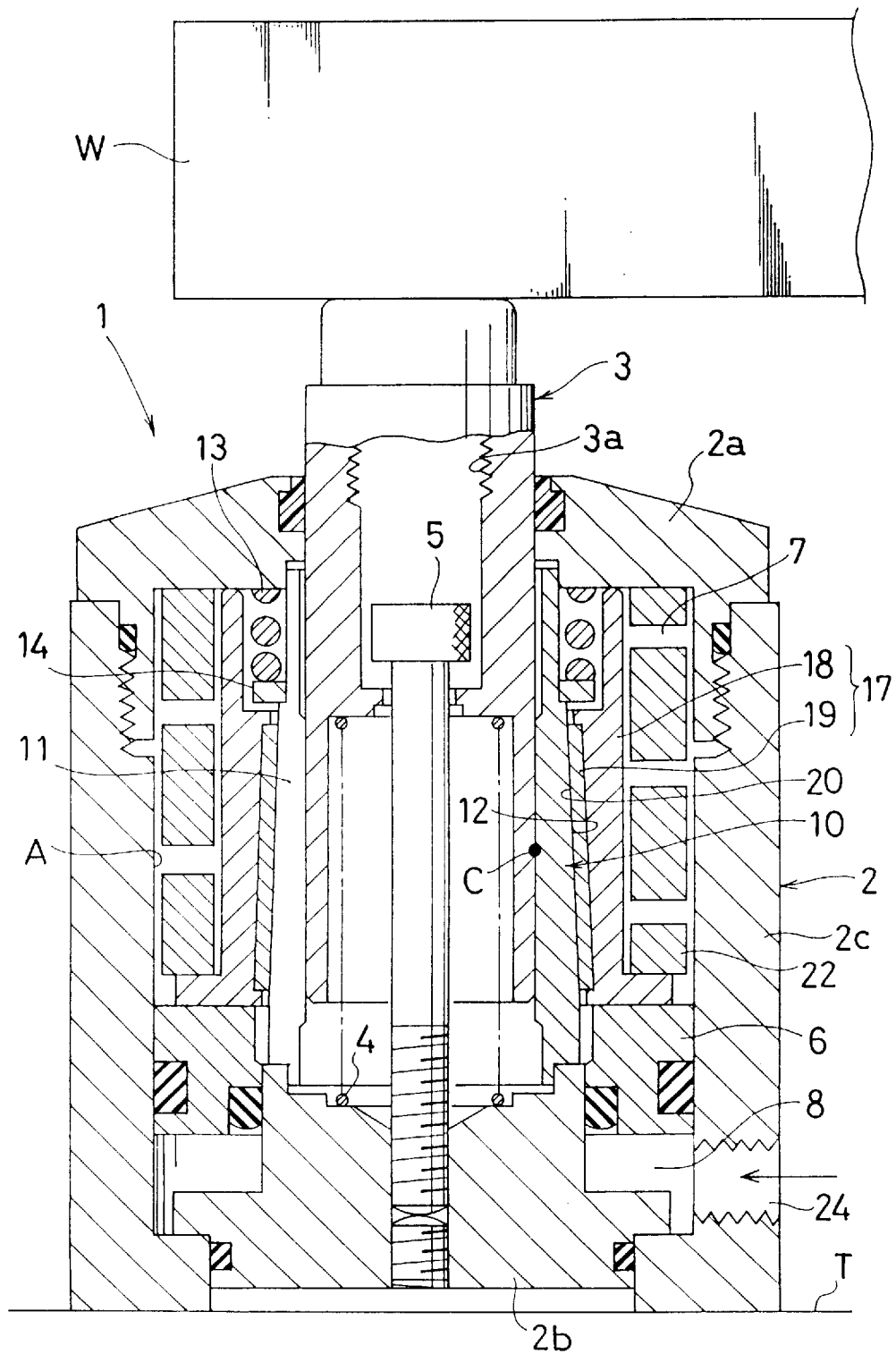
FIG. 1 is a vertical sectional view of a first embodiment of the present invention.

First, a first embodiment of the present invention is explained with reference to FIG. 1.

A housing 2 of a work support 1 comprises an upper end wall (first end wall) 2a, a lower end wall (second end wall) 2b and a barrel portion 2c. And it is fixed to a table (T) by a plurality of bolts (not shown). A support rod 3 is vertically movably inserted into the housing 2. The support rod 3 projects upwards by an advancing spring (advancing means) 4 and its upper end comes to contact with a work (W). A bolt 5 regulates the projecting length of the support rod 3.

Further, an attachment (not shown) may be brought into screw-thread engagement with a female screw 3a provided in an upper end of the support rod 3 so as to be vertically adjustable and made to contact with the work (W) at its upper portion.

An annular clamp chamber (A) is formed between the barrel portion 2c of the housing 2 and an outer peripheral surface of the support rod 3. A spring chamber 7 is formed on an upper side of a piston 6 inserted into the clamp chamber (A) and a hydraulic actuation chamber (fluid-pressure actuation chamber) 8 is formed on a lower side of the piston 6.

A holding and fixing portion (C) is provided at a lower side portion of the outer peripheral surface of the support rod 3 and a cylindrical collet 10 is externally fitted onto the holding and fixing portion (C). The collet 10 is adapted to diametrically contract owing to elastic deformation by a single slit 11 extending vertically. The collet 10 is also formed on its outer periphery with an upwardly tapered pressure receiving surface 12. The collet 10 is urged downward by a return spring 13, which is a return means, to be received by the lower end wall 2b. Numeral 14 designates a spring retainer.

A tapered transmission member 17 to be externally fitted onto the collet 10 is composed of an outer cylinder 18 placed on an upper surface of the piston 6 and an inner cylinder 19 serving as a low friction liner. The pressure receiving surface 12 is engaged with a pushing surface 20 formed on an inner surface of the inner cylinder 19 and upwardly tapered. Attached between a lower portion of the outer cylinder 18 and the upper end wall 2a is a holding spring 22, which is composed of a compressed coil spring rectangular in section.

The work support 1 operates as follows.

When supporting the work (W) from below, pressurized oil is first supplied to the hydraulic actuation chamber 8 through a supply and discharge port 24. Then, as shown, the piston 6 moves the transmission member 17 upward against the holding spring 22 to release the diametrical contraction of the collet 10 and the advancing spring 4 makes the support rod 3 lightly contact with the under surface of the work (W).

Next, when the pressurized oil within the actuation chamber 8 is discharged, the transmission member 17 is moved downward through the urging force of the holding spring 22 and the pushing surface 20 of the inner cylinder 19 comes into tapering engagement with the pressure receiving surface 12 of the collet 10. Thus the collet 10 diametrically contracts, so that its inner surface radially pushes the holding and fixing portion (C) of the support rod 3 and holds the support rod 3 at an illustrated height. Incidentally, if a tapering angle of the pressure receiving surface 12 of the collet 10 is set at about 4°, there is produced a holding and fixing force which is about two to three times the urging force of the holding spring 22. As a result, the support rod 3 can be strongly held.

Subsequently, an upper surface of the work (W) is machined. After the machining has been completed, it is enough if pressurized oil is supplied again to the actuation chamber 8 so as to cancel the clamping condition of the support rod 3.

The work support 1 of the foregoing construction has the following advantage when compared with the above-mentioned conventional work support of hydraulic clamp type.

According to the conventional technique, any hydraulic force does not act in unclamping condition while a strong hydraulic force acts in clamping condition. Therefore, a big difference occurs between these two conditions in the amount of the elastic deformation caused axially of the housing. However, the present invention does not cause such a big difference for the following reasons.

In the unclamping condition shown in FIG. 1, the holding spring 22 has an urging force (e.g. about 500 kgf) greater than in the clamping condition because it is compressed by the upward movement of the piston 6. The urging force of the spring 22 is received by the lower end wall 2b through a lower portion of the transmission member 17, the piston 6 and an oil column of the actuation chamber 8, and it is also received by the upper end wall 2a, thereby pulling the housing 2 axially to elastically deform it.

When the pressurized oil within the actuation chamber 8 is discharged so as to switch over from the unclamping condition to the clamping condition, the holding spring 22 is extended to bring the transmission member 17 into tapering engagement with the collet 10. Thus the urging force of the spring 22 is received by the lower end wall 2b through the transmission member 17 and the collet 10, and it is also received by the upper end wall 2a, thereby pulling the housing 2 axially to elastically deform it as in the case of the unclamping condition.

The urging force of the spring 22 in the clamping condition is e.g. about 450 kgf, which is substantially the same as that in the unclamping condition because it only decreases in correspondence with the length extended for the tapering engagement.

Accordingly, on switching over from the unclamping condition to the clamping condition, there is not caused a big variation in the pulling force acting on the housing 2, which in turn prevents a big difference from occurring in the amount of the elastic deformation caused axially of the housing 2.

As a result, the present invention can inhibit the height of the holding and fixing portion (C) of the support rod 3 from varying with respect to the housing 2 to thereby increase the accuracy of the machining dimension of the work (W).

The above first embodiment further presents the following advantage.

It is possible for the collet 10 to be attached at a lower portion within the housing 2, so that the height of the holding and fixing portion (C) of the support 3 can be lowered. Therefore, the collet 10 deforms by compression through the urging force of the holding spring 22 in a reduced amount. As a result, the height of a leading end of the support rod 3 held and fixed to the collet 10 varies only by a small amount to further enhance the accuracy of the machining dimension of the work (W).

Notably, in the above embodiment, the piston 6 and the transmission member 17 may be formed in an integral structure instead of being formed separately from each other as shown. Further, the urging force of the holding spring 22 may be made to act on the transmission member 17 through the piston 6 instead of directly.

Figure 2:
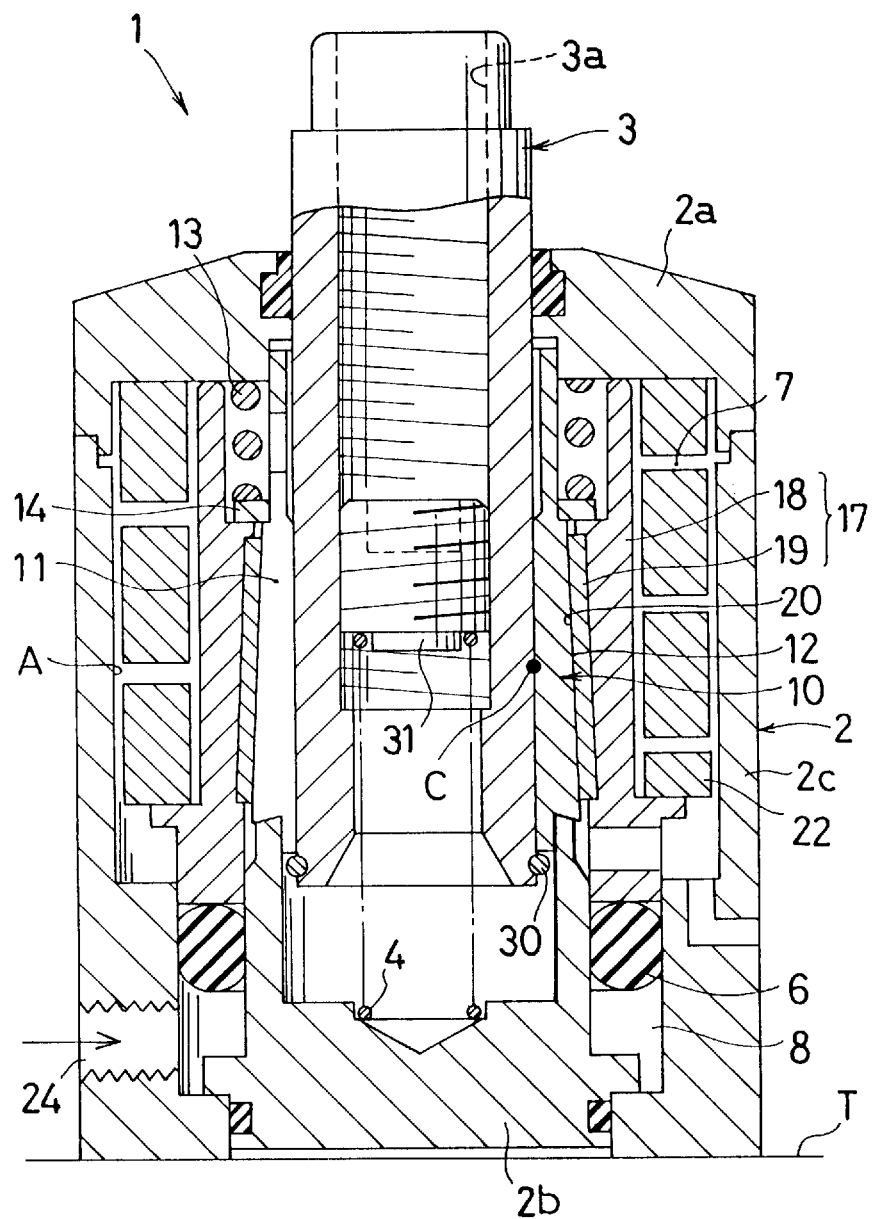
FIG. 2 is a vertical sectional view of a second embodiment of the present invention.

Next, a second embodiment of the present invention is explained with reference to FIG. 2. In this second embodiment, the members of the same constructions as those of the first embodiment are in principle designated by the same characters.

In this embodiment, the piston 6 is composed of an O-ring which is a sealing member. Further, a retaining ring 30 regulates the projecting length of the support rod 3. Besides, the urging force of the advancing spring 4 is adjusted by a bolt 31 threadably engaged with the female screw 3a of the support rod 3. The upper end wall 2a of the housing 2 is secured to the barrel portion 2c by a plurality of bolts (not shown).

The foregoing respective embodiments can be modified as follows.

The collet 10 may be provided with plural slits instead of such a single slit 11 as exemplified.

In addition, the collet 10 may be formed from plural segments instead of being formed as an exemplified integral unit. In this case, the diametrical contraction of the segments may be released either by their own elastic restoring force or by a separately provided spring for diametrical expansion.

The advancing means 4 may employ either other kinds of elastic members such as rubber or compressed air instead of a spring.

The holding spring 22 may have a circular section instead of a rectangular section.

The spring chamber 7 and the hydraulic actuation chamber 8 may be arranged in a manner vertically opposite to that exemplified. More specifically, in this case, formed between the lower end wall 2b of the housing 2 and the piston 6 is a spring chamber, within which a holding spring is attached. Further, a hydraulic actuation chamber is formed between the upper end wall 2a of the housing 2 and the piston 6. A pushing surface formed on an inner periphery of the transmission member and a pressure receiving surface formed on an outer periphery of the collet are tapered toward the lower end wall 2b of the housing 2. The upper end wall 2a of the housing 2 receives the upper portion of the collet.

A pressurized fluid to be supplied to the actuation chamber 8 may be air or the like gases instead of a liquid such as pressurized oil.

The work support 1 may be disposed so that the axis of the support rod 3 is directed horizontally or slantingly instead of vertically.

What is claimed is:
1. A work support, comprising:
 a housing (2) having an axis, a first end wall (2a) and a second end wall (2b);
 a support rod (3) axially movably mounted in the housing (2), the support rod (3) having a holding and fixing portion (C);
 and advancing means (4) for advancing the support rod (3) outwardly from the housing (2);
 a collet (10) externally fitted on to the holding and fixing portion (C) of the support rod (3) and axially received in the housing (2) the collet (10) having a pressure receiving surface (12) formed on an outer periphery thereof, the pressure receiving surface (12) tapering toward the first end wall (2a);
 a tapered transmission member (17) externally fitted onto the collet (10), the transmission member (17) having a pushing surface (20) formed on an inner periphery thereof, the pushing surface (20) tapering toward the first end wall (2a), the pushing surface (20) being coextensive at least in part with the pressure receiving surface (12);
 a holding spring (22) which biases the transmission member (17) toward the second end wall (2b) to axially move the transmission member (17) in a first direction such that the pushing surface (20) applies a radial force on the pressure receiving surface (12) to diametrically contract the collet (10) and an axial force on the pressure receiving surface (12) to abut the collet (10) with the second end wall (2b); and a fluid-pressure piston (6) arranged adjacent the transmission member (17) toward the second end wall (2b) to axially move the transmission member (17) against the holding spring (22) in a second direction so as to release the radial force of the pushing surface (20) on the pressure receiving surface (12) diametrically contracting the collet (10).

2. A work support as set forth in claim 1, wherein the holding spring (22) is mounted between the first end wall (2a) and the transmission member (17), and a fluid-pressure actuation chamber (8) is formed between the second end wall (2b) and the piston (6).

3. A work support as set forth in claim 2, wherein the collet (10) is adapted to be movable in the axial direction within a predetermined range, a return means (13) being mounted between the collet (10) and the first end wall (2a), the return means (13) urging the collet (10) toward the second end wall (2b).

4. A work support as set forth in claim 1, wherein the tapered transmission member (17) has an outer cylinder (18) and an inner cylinder (19) internally fitted into the outer cylinder (18), the inner cylinder (19) being composed of a low friction liner.

5. A work support as set forth in claim 1, wherein the piston (6) is formed in an annular shape, the annular piston (6) being constructed separately from the transmission member (17).

6. A work support as set forth in claim 5, wherein the piston (6) is composed of a sealing member, the piston (6) composed of the sealing member being received by the transmission member (17).

7. A work support as set forth in claim 2, wherein the piston (6) is formed in an annular shape, the annular piston (6) being constructed separately from the transmission member (17).

8. A work support as set forth in claim 3, wherein the piston (6) is formed in an annular shape, the annular piston (6) being constructed separately from the transmission member (17).

9. A work support as set forth in claim 4, wherein the piston (6) is formed in an annular shape, the annular piston (6) being constructed separately from the transmission member (17).

* * * * *